United States Patent
Ogawa et al.

(10) Patent No.: US 6,588,462 B1
(45) Date of Patent: Jul. 8, 2003

(54) FILLING DEVICE AND FILLING METHOD

(76) Inventors: Taro Ogawa, 3-52, Kojima Ajinokami 1-chome, Kurashiki-city, Okayama 711-0917 (JP); Yasumasa Senoo, 4-5-43, Kojima-Shimonocho, Kurashiki-city, Okayama 711-0906 (JP); Yasuyuki Toda, 6402-1, Tamashima-Otoshima, Kurashiki-city, Okayama 713-8103 (JP); Mitsuo Katayama, 2605 Nadasakicho-Hikozaki, Kojima-gun, Okayama 709-1213 (JP); Takahiro Hara, 4-84, Idacho, Owariasahi-city, Aichi 488-0024 (JP)

( * ) Notice: Subject to any disclaimer, the term of this patent is extended or adjusted under 35 U.S.C. 154(b) by 0 days.

(21) Appl. No.: 10/018,635

(22) PCT Filed: Mar. 10, 2000

(86) PCT No.: PCT/JP00/06886

§ 371 (c)(1),
(2), (4) Date: Mar. 19, 2002

(87) PCT Pub. No.: WO01/89793

PCT Pub. Date: Nov. 29, 2001

(30) Foreign Application Priority Data

May 26, 2000 (JP) ........................................ 2000-155907

(51) Int. Cl.[7] .............................................. B65B 31/04
(52) U.S. Cl. ............................ 141/65; 141/67; 406/146
(58) Field of Search .............................. 141/65, 67, 68, 141/69, 8; 406/73, 85, 122, 144, 146, 151

(56) References Cited

U.S. PATENT DOCUMENTS

| | | | | |
|---|---|---|---|---|
| 2,753,220 A | * | 7/1956 | Kemper | 406/146 |
| 3,693,836 A | * | 9/1972 | Eisner | 141/67 |
| 3,726,954 A | * | 4/1973 | Munk et al. | 141/67 |
| 4,262,731 A | * | 4/1981 | Wetzel | 164/19 |
| 4,664,160 A | | 5/1987 | Rothstein et al. | 141/67 |
| 4,900,200 A | * | 2/1990 | Harumoto et al. | 406/151 |
| 5,340,241 A | * | 8/1994 | Thiele et al. | 406/144 |
| 5,503,198 A | * | 4/1996 | Becker | 141/67 |
| 5,571,465 A | * | 11/1996 | Gill et al. | 264/121 |
| 5,947,645 A | * | 9/1999 | Rixom et al. | 406/32 |
| 5,967,704 A | * | 10/1999 | Cipriani | 406/146 |
| 6,033,607 A | * | 3/2000 | Kataoka et al. | 264/40.3 |
| 6,096,249 A | * | 8/2000 | Yamaguchi | 264/40.3 |

FOREIGN PATENT DOCUMENTS

| | | |
|---|---|---|
| EP | 0894885 | 2/1999 |
| JP | 54-127476 | 10/1979 |
| JP | 8-258059 | 10/1996 |
| JP | 9-84972 | 3/1997 |

* cited by examiner

Primary Examiner—Timothy L. Maust
Assistant Examiner—Khoa D. Huynh

(57) ABSTRACT

A filler material packing system according to the present invention for packing a granular or fragmental filler material in a bag-shaped hollow surface material includes: a suction pump; a suction-type packing container having an inner space for positioning the surface material, a suction port connected between the inner space and the suction pump, and an entry port provided in coaxial with an opening of the surface material, the filler material being delivered in the surface material through the entry port and its opening; and a feeder for delivering the filler material. The feeder has a lid, a sidewall and a bottom wall. The feeder has air vent holes and an outlet provided in an upper part thereof. The outlet port connects with the entry port of the suction-type packing container through connecting means, and thereby, the air vent holes are connected to the entry port.

10 Claims, 10 Drawing Sheets

(a)

(b)

FILLING DEVICE AND FILLING METHOD

TECHNICAL FIELD

The present invention relates to a system and method for packing a granular or fragmental filler material in a bag-shaped hollow surface material and, in particular, relates to such a system and method capable of smoothly packing the filler material in the surface material.

BACKGROUND OF THE ART

A cushion may be used for a headrest and an armrest of a seat used for an automobile. Such a cushion is composed of a bag-shaped hollow surface material and an inner body covered with the surface material. The inner body is molded in a predetermined shape by passing steam through urethane chips mixed with a water reactive urethane binder and is then covered with the surface material. As a problem of the art, it is not easy to cover the inner body with the surface material so that it takes much time for such a covering work, and as another problem, a wrinkle is produced on the surface material and a seam line of the surface material is curved so that it makes its quality worse.

Such problems can be solved by a prior art disclosed in Japanese Patent Application No. Heisei 11(1999)-289480 filed by the same assignee as that of the present patent application. This prior art provides filler material packing system and method for packing a granular or fragmental filler material in a bag-shaped hollow surface material, and the filler material may be made of granules or fragments of urethane foam and the surface material to be wasted. In the system and method of the prior art, as shown in FIG. 1A, an article 1 formed by packing a bag-shaped hollow surface material 1a having the air-permeability with the filler material mixed with a water reactive binder is positioned in a molding device 2 having a predetermined cavity comprising of an upper and a lower molds 2a, 2b and is then clamped therein. Then, as shown in FIG. 1B, steam is passed through the inside of the molding device 2. The binder reacts with the steam so that the filler material is adhered each other and is adhered with the inner surface of the surface material. Thereby, a product 3 having a predetermined shape is molded in one with the surface material without producing wrinkle on the surface material and curving the seam line of the surface material.

An article 1 as described above is molded by use of a suction-type packing container shown in FIG. 2. The suction-type packing container 3 is composed of a lower part 3b and an upper part 3a that can seal the inside of the suction-type packing container 3, and as shown in FIG. 2, a bag-shaped hollow surface material 1a having an opening 1b is positioned inside the suction-type packing container 3. The lower part 3b has a suction port 4 connected to a suction pump and an entry port 5 for delivering a filler material T through this entry port 5. In order to make easy to deliver the filler material T to the inside of the surface material 1a, a funnel 6 is positioned such that the funnel 6 passes through the entry port 5 and comes into the inside of the surface material 1a through the opening 1b thereof. In this arrangement, when the suction pump is driven, air inside the suction-type packing container 3 is evacuated and the inside of the suction-type packing container 3 is decompressed so that air is entered in the inside of the suction-type packing container 3 through the entry port 5 and the opening 1b via the funnel 6. When the filler material T is approached to the funnel 6, the filler material T is delivered by the airflow to the inside of the surface material 1a, and thereby the surface material 1a is packed with the filler material T.

As described above, it has been possible to easily pack a bag-shaped hollow surface material with a predetermined amount of a filler material.

According to this packing method, granular or fragmental waste of surface material and urethane foam can be recycled to manufacture a seat and an accessory used for an automobile.

It is desirable that a filler material should be stably delivered through the entry port of the suction-type packing container by use of airflow when a bag-shaped hollow surface material is packed with the filler material as described above, and in order to achieve that the filler material is stably delivered through the entry port it is necessary that the filler material should be mixed evenly with the airflow. If the filler material is concentrated locally in the airflow or if there is a mass of the filler material in the airflow, the entry port may be blocked so that the filler material cannot be delivered through the entry port.

In addition to this matter, if the density of the filler material in the airflow is changed, the filler material may be unevenly packed in the surface material so that the filler material is not stably adhered each other and with the inner surface of the surface material even though the filler material is premixed with a binder.

The present invention is made to solve those problems, and thus, an object of the present invention is to provide a filler material packing system and method capable of delivering a scattered filler material to the entry port.

Another object of the present invention is to provide such a filler material packing system and method in which the filler material is delivered in a uniform density to the inside of a bag-shaped hollow surface material.

The other object of the present invention is to provide such a filler material packing system and method in which the filler material is stably delivered to the inside of the surface material.

DISCLOSURE OF THE INVENTION

A filler material packing system according to the present invention for packing a granular or fragmental filler material in a bag-shaped hollow surface material includes a suction pump, a suction-type packing container, and a feeder for delivering the filler material. The suction-type packing container has an inner space, the surface material is positioned in the inner space. The suction-type packing container has a suction port connected to the suction pump, and thereby the inner space is connected to the suction pump. Also, the suction-type packing container has an entry port provided in coaxial with an opening of the surface material, and the filler material is delivered in the surface material through the entry port and the opening of the surface material. The feeder has a lid, a sidewall and a bottom wall. Air vent holes and an outlet port are provided in an upper part of the feeder. The outlet port is connected to the entry port of the suction-type packing container through connecting means, and thereby, the air vent holes are connected to the entry port The bottom wall of the feeder is vertically movable. At least a part of the surface material is air-permeable.

Preferably, the suction-type packing container is composed of an upper part and a lower part, and those parts are pivotally connected each other. A molding device is placed in the inner space of the suction-type packing container. The molding device has an upper mold and a lower mold, and a cavity that can position the surface material is formed by those molds. Those molds have suction holes that connect between the inside and the outside of the cavity. The molding device has an inlet coaxial with the entry port of the suction-type packing container.

The upper mold of the molding device is fixed to the upper part of the suction-type packing container, and the lower mold of the molding device is fixed to the lower part of the suction-type packing container. Thereby, when the upper part of the suction-type packing container is opened with respect to its lower part, the upper mold of the molding device is simultaneously opened with respect to the lower mold of the molding device. The opening of the surface material is desirably connected with the entry port of the suction-type packing container using a funnel.

The bottom wall of the feeder is desirably moved vertically using an air cylinder.

In accordance with the present invention, the filler material is packed in the surface material using the filler material packing system described above. A necessary amount of the filler material is brought in the feeder. The bottom wall of the feeder is positioned so as to form a predetermined space between the lid of the feeder and an upper surface of the filler material brought therein. The outlet of the feeder is connected to the entry port of the suction-type packing container through the connecting means. The suction pump is driven, and as a result airflow is formed through the filler material packing system. The airflow is formed from the air vent holes of the feeder to the outlet port of the feeder, from the outlet port to the entry port of the suction-type packing container through the connecting means and from the opening of the surface material coaxial wit the entry port to the suction port of the suction-type packing container through the inside of the surface material. When the airflow is formed, the bottom wall of the feeder is moved upward in order to necessarily mix the air and the filler material in the space between the lid of the feeder and the upper surface of the filler material brought therein.

BEST MODE FOR CARRYING OUT THE INVENTION

Figure 3:
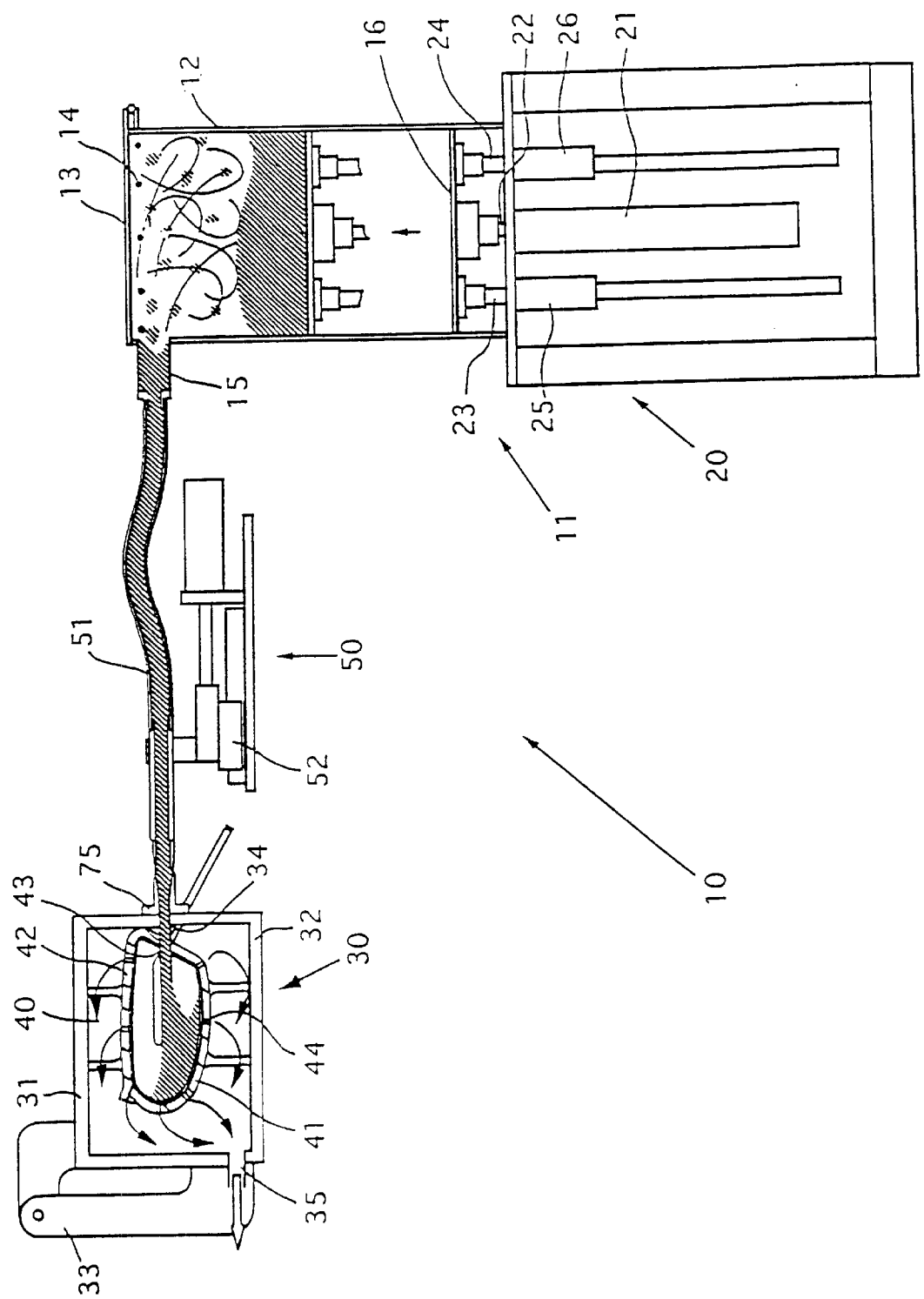
FIG. 3 shows a filler material packing system according to the present invention.

FIG. 3 shows a filler material packing system 10 according to the present invention. The filler material packing system 10 is composed of a feeder 11, a suction-type packing container 30, and a connector 50 for connecting between the feeder 11 and the suction-type packing container 30.

Figure 4:
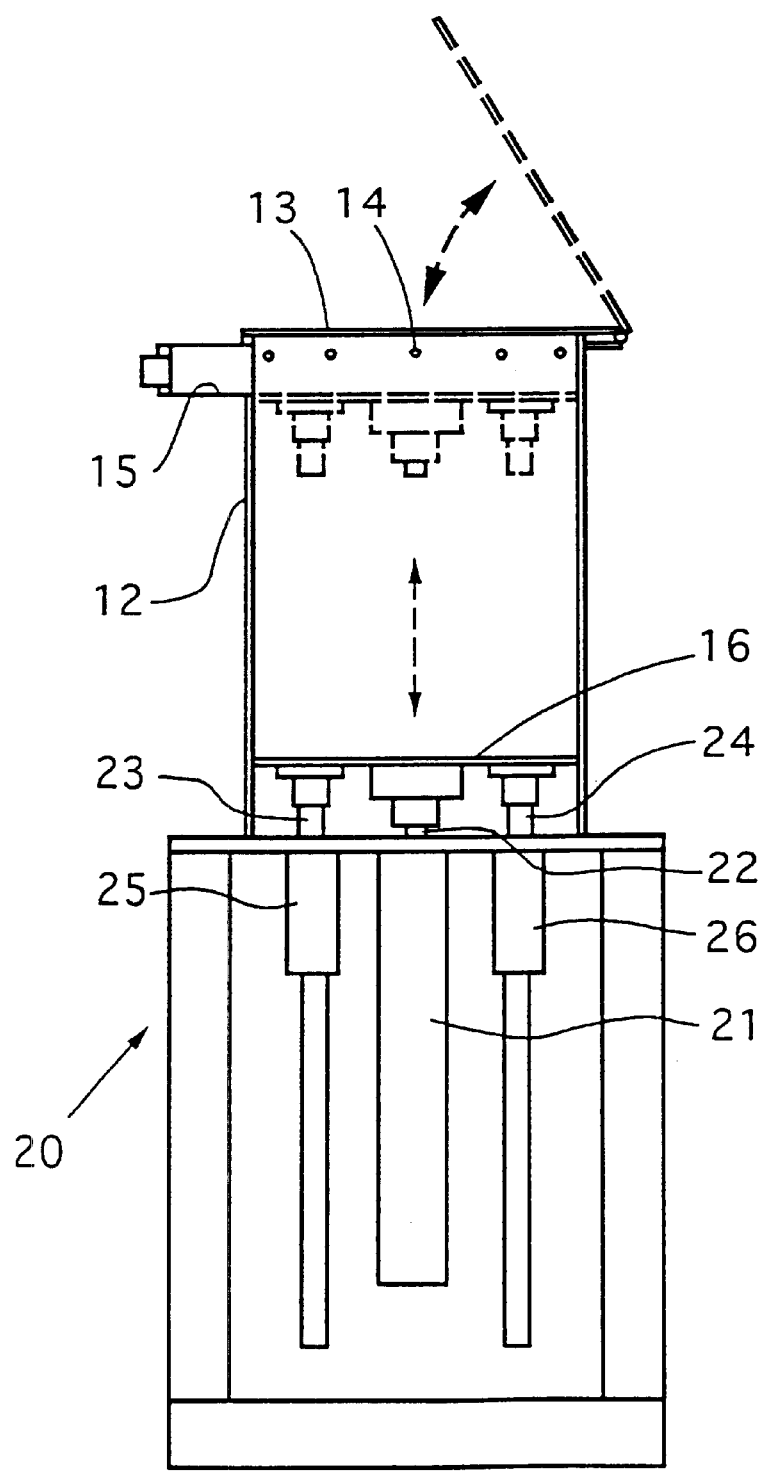
FIG. 4 shows a partial sectional view of a feeder of a filler material packing system according to the present invention.

The feeder 11 delivers a granular or fragmental filler material brought therein to the suction-type packing container 30. As shown in FIG. 4, a lid 13 is provided with a hinge on a top end of a cylindrical sidewall 12, and the feeder 11 has a plurality of air vent holes 14 provided around an upper part of the sidewall 12. Those air vent holes 14 are provided for drawing air into a space formed inside the cylindrical sidewall 12, as described below. Such air vent holes may be provided not only around the cylindrical sidewall 14 but also on the lid 13. The feeder 11 has an outlet port 15 for delivering the filler material from the feeder to the suction-type packing container. Also, the feeder 11 has a bottom wall 16 vertically movable in the space formed inside the cylindrical sidewall 12.

A lift 20 is provided under the cylindrical sidewall 12, and the bottom wall 16 can be moved vertically inside the cylindrical sidewall 12 by driving the lift 20. The lift 20 has an air cylinder 21, and a main shaft 22 of the air cylinder 21 is fixed on a back surface of the bottom wall 16. The lift 20 has two additional shafts 23, 24, and those shafts 23, 24 are fixed on the back surface of the bottom wall 16. Those additional shafts 23, 24 extend downward so as to pass through cylindrical supports 25, 26 fixed on the lift 20, so that a wall surface of the bottom wall 16 can be maintained in horizontal when the bottom wall 16 is moved vertically.

When the shaft 22 is moved vertically by driving the air cylinder 21, the bottom wall 16 is moved vertically together with the shafts 23, 24.

Figure 5:
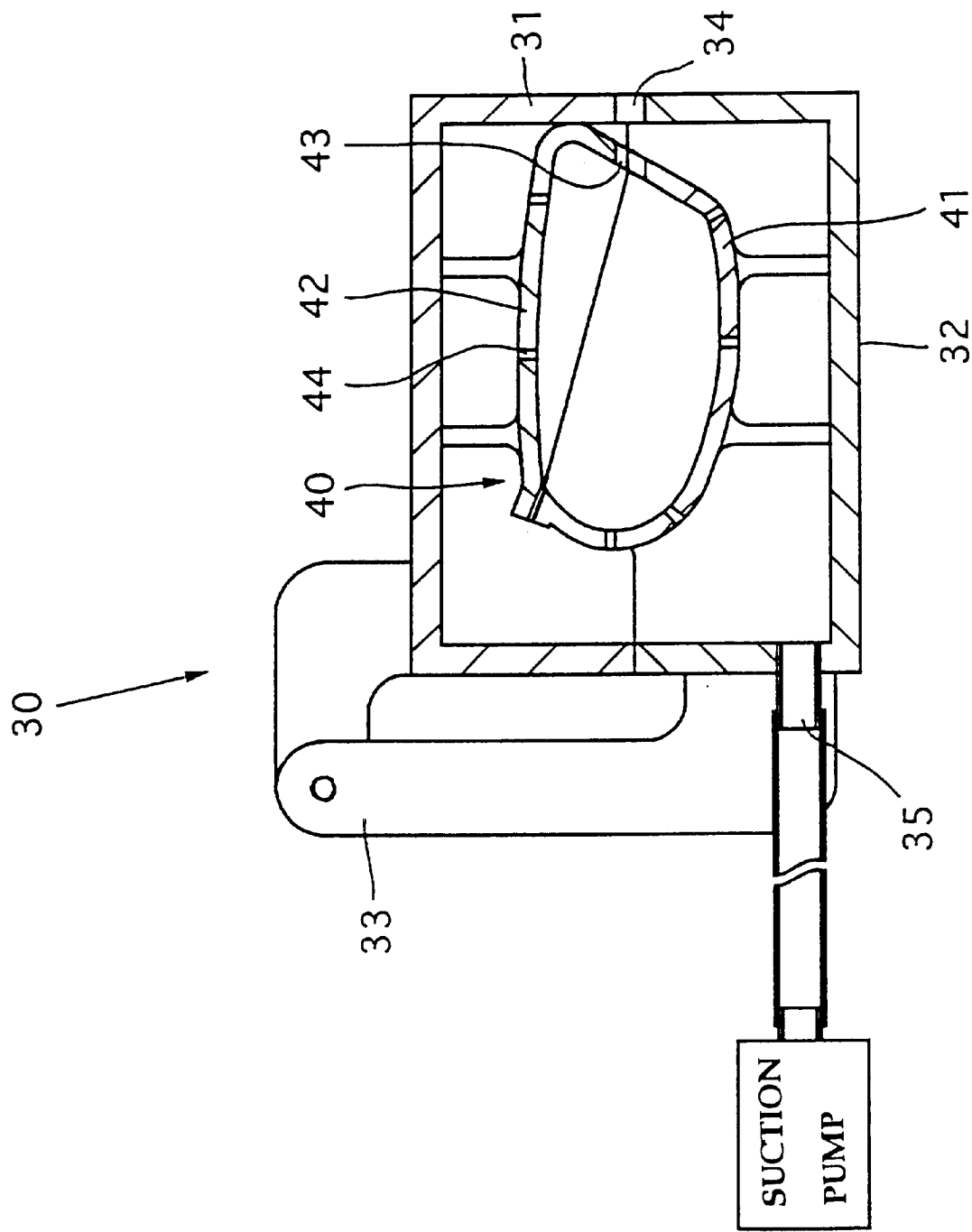
FIG. 5 is a partial sectional view of a suction-type packing container of a filler material packing system according to the present invention.
Figure 6:
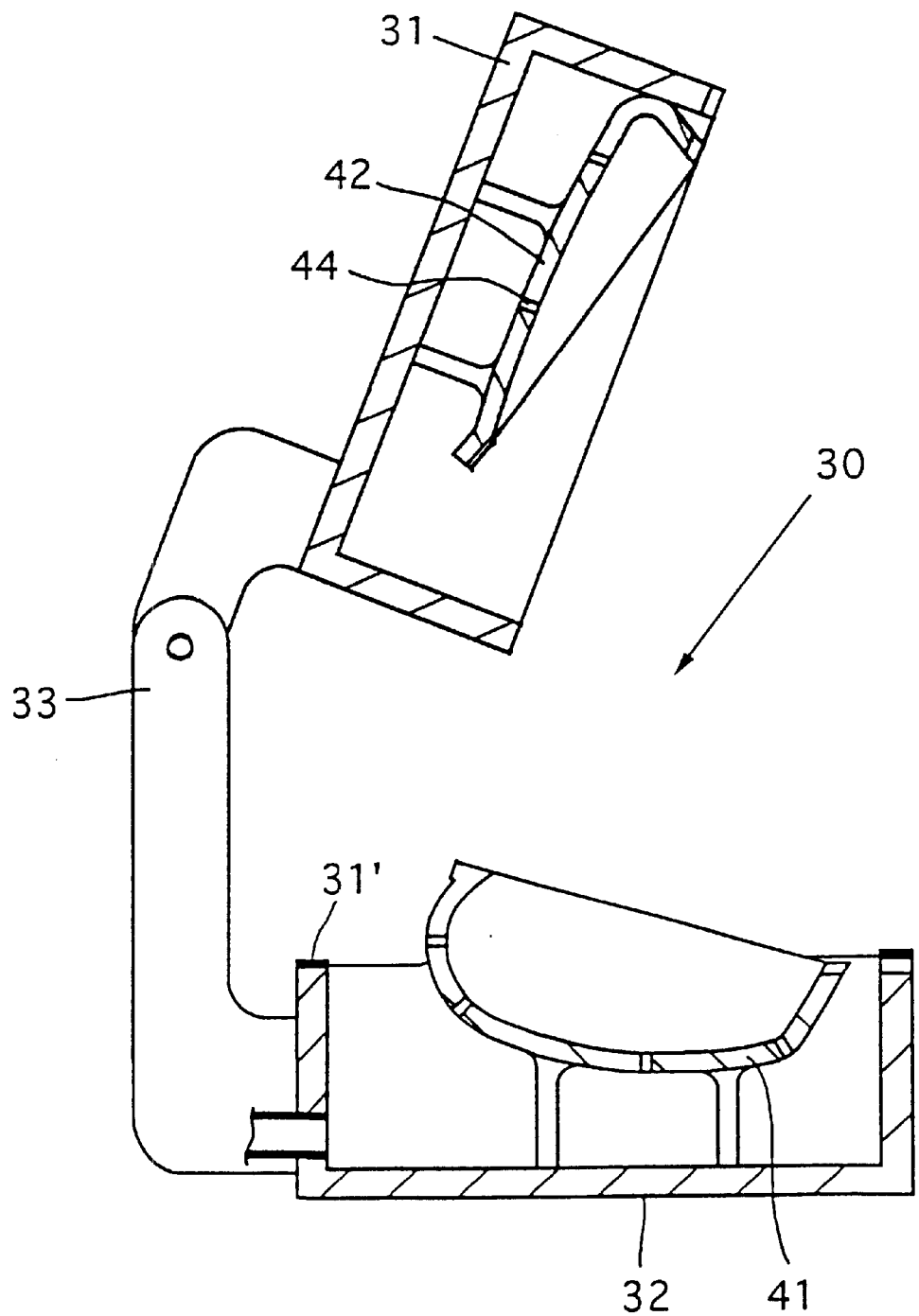
FIG. 6 shows that an upper part of the suction-type packing container shown in FIG. 5 is opened.

The suction-type packing container 30 is shown in FIGS. 5 and 6. The suction-type packing container 30 is composed of an upper part 31 and a lower part 32, and the upper part 31 is connected with the lower part 32 by use of a connector 32 so as to freely open and close those portions. When those parts are closed, a cavity is formed therein. In order to seal the cavity formed in the suction-type packing container 30, a seal material 32' (FIG. 6) is provided on a connection between those parts 31, 32. An entry port 34 for delivering a filler material to the inside thereof is also provided in a part of the connection. In addition, a suction port 35 is provided in the lower part 32, and its location is opposite to the entry port 34. The suction port 35 is connected to a suction pump.

The connector 50 connects between the entry port 34 of the suction-type packing container 30 and the outlet port 15 of the feeder 10. The connector 50 has a flexible pipe 51, and an end of the flexible pipe 51 can be attached to the entry port 34 by use of a pipe-guiding device 51.

Thus, when the upper and lower parts 31, 32 are closed and the suction pump is then driven, air inside the suction-type packing container is evacuated and air inside the feeder (i.e. air presented in a space between the lid 13 and the bottom wall 16) is also evacuated through the pipe 51 connected between the entry port 34 of the suction-type packing container 30 and the outlet port 15 of the feeder 10. When this, air is drawn into the feeder 11 through the air vent holes 14, so that airflow is formed by driving the suction pump from the air vent holes 14 to the suction port 35 through the inside of the feeder 11, the pipe 51 of the connector 50, the entry port 34 and the inside of the suction-type packing container 30.

In the operation, an air-permeable bag-shaped hollow surface material (shown below as an example) is positioned in the suction-type packing container 30 so as to match an opening of the surface material to the entry port 34, and a necessary filler material is brought into the feeder. Then, the suction pump is driven. The filler material is delivered to the inside of the surface material together with the airflow described above, and as a result, an article composed of the surface material and the filler material packed therein is formed. If it is necessary to mold the article, a molding device 40 is arranged inside the suction-type packing container 30.

As shown in FIG. 5, the molding device 40 arranged in the suction-type packing container 30 is composed of an upper mold 42 and a lower mold 41. An inlet port 43 coaxial with the entry port 34 is provided in a connection between those upper and lower molds 42, 41. Those upper and lower molds 42, 41 have a plurality of suction holes 44 connected between the inside and the outside of the molding device 40.

The lower mold 42 is fixed to the lower part 32 of the suction-type packing container 30, and the upper mold 42 is the upper part 31 of the suction-type packing container 30. Thus, as shown in FIG. 6, when the upper part 31 is pivotally moved with respect to the connector 33, the upper mold 42 is moved together with the upper part 31 with respect to the lower mold 41.

Steps of packing a surface material with a filler material by use of this filler material packing system 10 are described below. A material used as the filler material includes chips of urethane foam, fabric, soft slab urethane foam produced in manufacturing steps in a seat and a headrest of an automobile. In addition, a material used as the filler material includes not only the above materials but also shredder dusts of a used automobile and light-weight materials such as feather and powder difficult to handle and bring into the surface material.

EXAMPLE

As an example of an article manufactured by packing a filler material in a surface material, a headrest used for an automobile is considered and is manufactured using the filler material packing system 10 according to the present invention.

Figure 7:
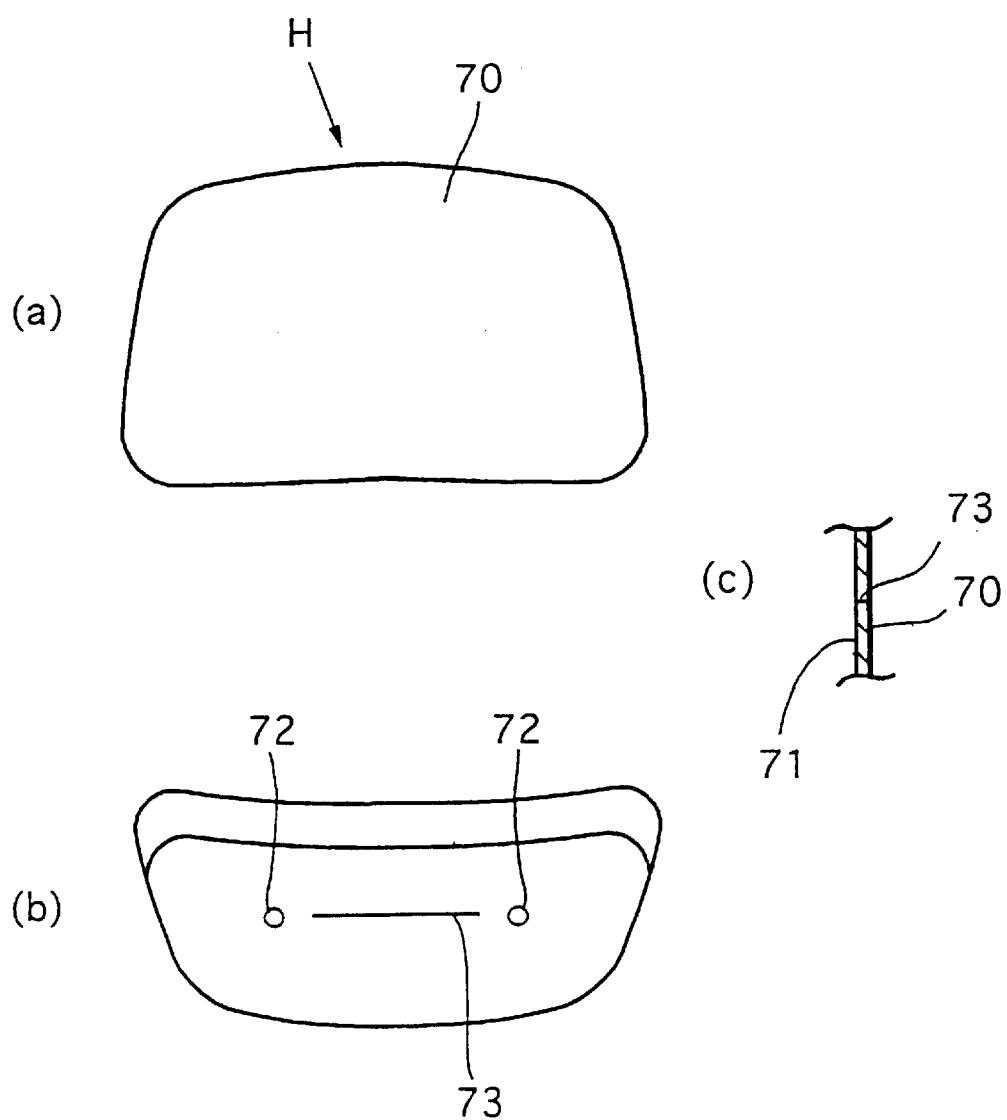
FIG. 7(a) is a front view of a surface material of a headrest used for an automobile.
FIG. 7(b) is a bottom view of the surface material and FIG. 7(c) is a partial sectional view of the surface material for showing a slit for supplying a filler material.

FIG. 7(a) is a front view of a surface material of a headrest H used for an automobile, and FIG. 7(b) is its bottom view. The surface material 70 used is formed of a fiber material and is thus air-permeable. A soft slab urethane foam is laminated on its inner surface. A bottom of the surface material 70 has two circular small holes 72, 72 and a slit 73 connected between those holes 72, 72. The holes 72 are provided for inserting a stay in the inside of the surface material 70, and the slit 73 is provided as an opening of the surface material 70. The slit 73 is usually closed as shown in FIG. 7(c).

The stay 74 is inserted in the surface material 70, and this surface material is then positioned in the molding device 40 (the upper mold 42 has been opened as shown in FIG. 6). A funnel 75 is positioned such that the funnel 75 connects between the entry port 34 and the inlet port 43 to smoothly deliver the filler material.

Figure 8:
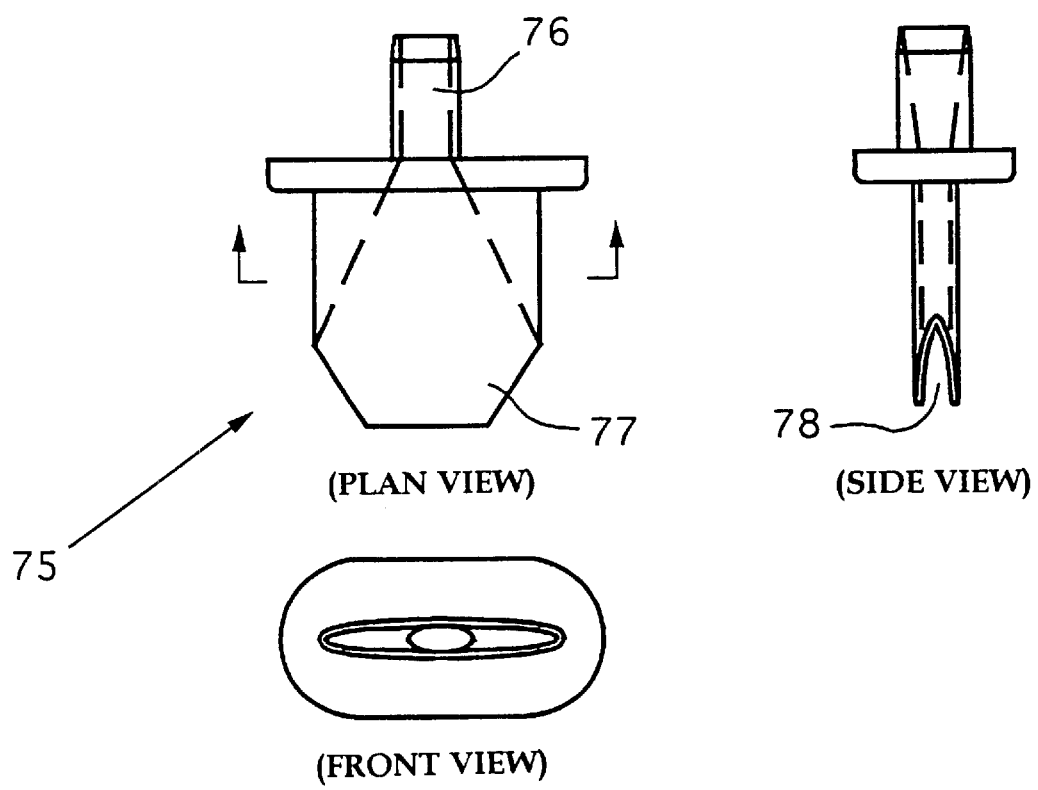
FIG. 8 shows a plan view, a front view and a side view of a funnel used for connecting between an entry port of a suction-type packing container and an opening of a surface material through an inlet of a molding device.

The funnel 75 is shown in detail in FIG. 8. The funnel 75 has a plug 76 that is inserted in an end of the flexible pipe 51 and a nozzle 77 that is inserted in the surface material 70 through the entry port 34 and the slit 73 (opening) of the surface material 70. The nozzle 77 has an elliptical internal channel diverted from an end of the plug 76, and the diverted angle is more than 45 degrees, so that the filler material delivered via the connector 50 can be evenly packed in the surface material 70.

Figure 1:
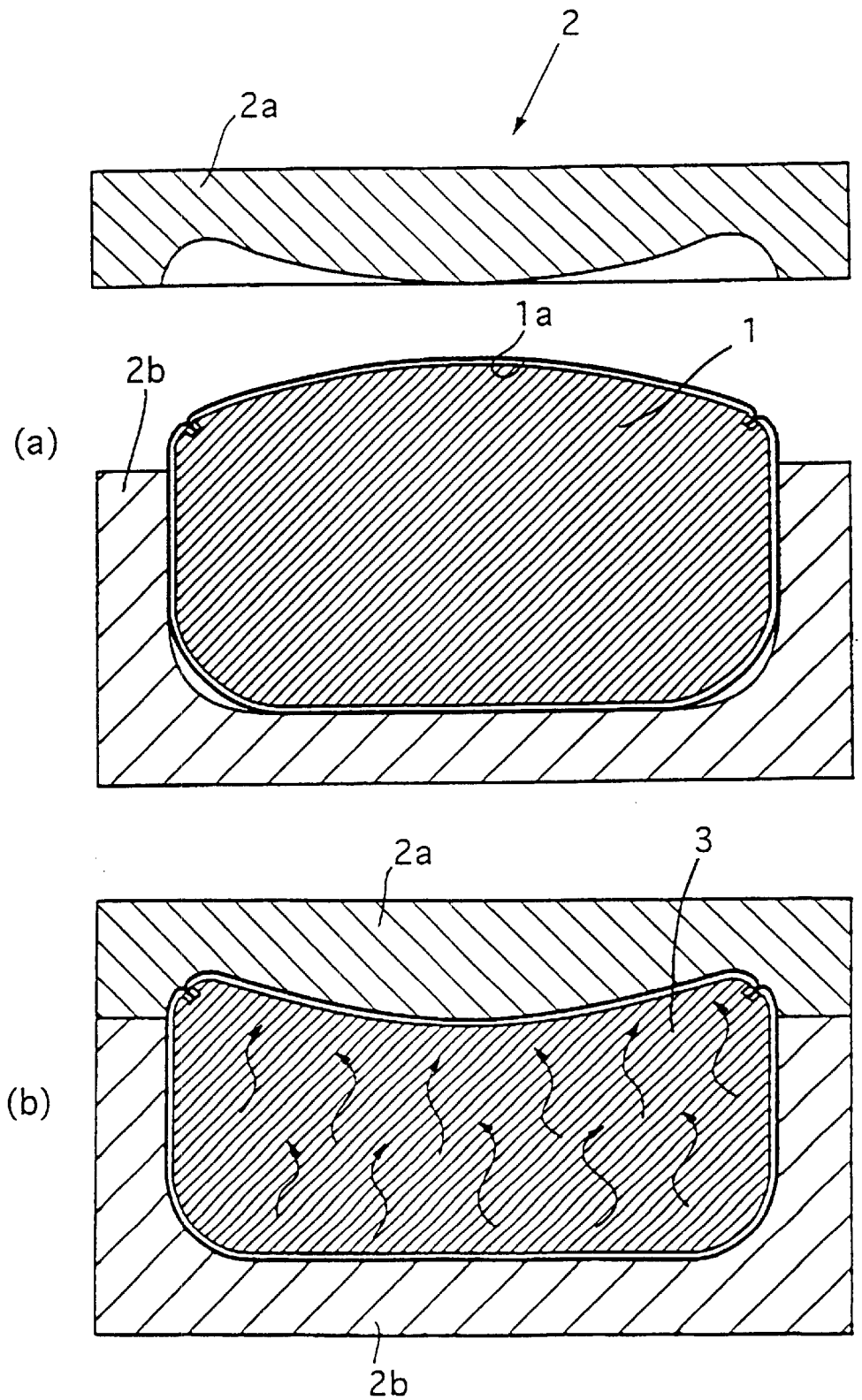
FIG. 1(a) shows that an article packed a filler material in a bag-shaped hollow surface material is positioned in a molding device.
FIG. 1(b) shows that steam passes through the article clamped in the molding device.
Figure 2:
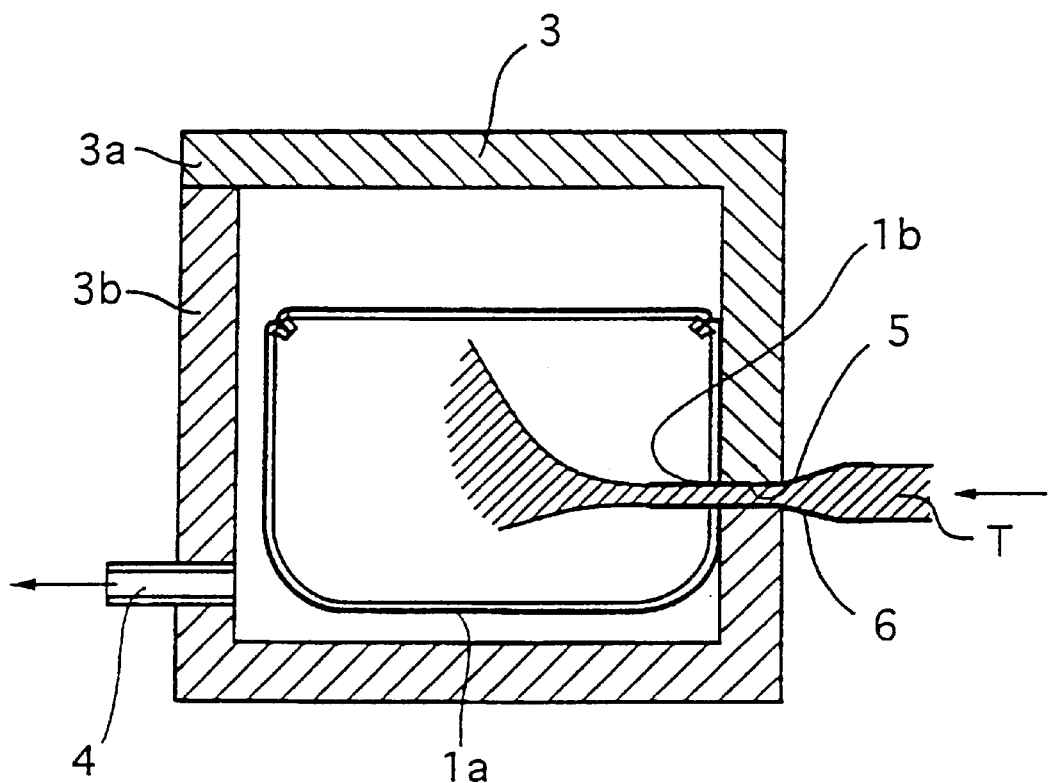
FIG. 2 shows that a filler material is delivered into a surface material positioned in a suction-type packing container using airflow.
Figure 9:
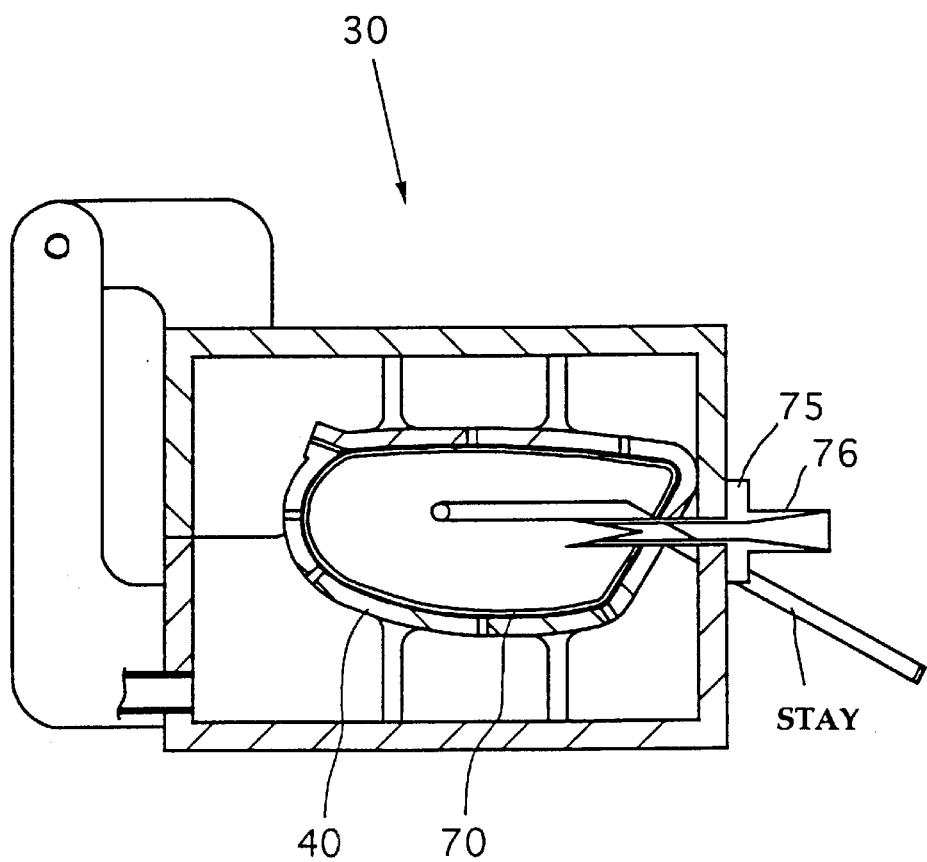
FIG. 9 shows that a surface material with a stay is positioned in a suction-type packing container and an upper part of the suction-type packing container is closed.

Then, as shown in FIG. 9, the upper part 31 of the suction-type packing container 30 is closed, and simultaneously, the upper mold 42 of the molding device 40 is closed. Then, as shown in FIG. 1, the outlet port 15 of the feeder 11 is connected with the plug 76 of the funnel 75 via the connector 50. A predetermined amount of the filler material T has been brought in the feeder 11.

Usually, a material used as the filler material is a mixture of chips of surface material and chips of mold urethane foam. Those chips are produced as waste in manufacturing steps. The mixing rate (by weight) of those chips 1:1. The mixture is premixed with a water reactive urethane binder (the mixture the binder=1:0.2). About 270 g of the filler material per one headrest is brought in the feeder.

Then, the suction pump is driven, and as described above, air is drawn into the feeder through the air vent holes 14. In this example, the size of each air vent hole is $\phi 4$ and twelve holes are provided in the feeder.

Air drawn into the feeder flows from the feeder through the outlet port 15 and then flows to the inside of the surface material 70 via the connector 50 and the funnel 75. Then, the air flown to the inside of the surface material 70 passes through the surface material and flows to the suction port 35 through the suction holes 44 of the molding device 40.

When such airflow is formed, air drawn through the air vent holes 14 makes air just above the filler material T on the bottom wall 16 turbulent such that a top portion of the filler material T is blown up by the turbulent airflow, and as a result, the filler material blown up is scattered and is mixed with the air. If the filler material is delivered to the connector 50 together with the air, a mass of the filler material is not formed and the filler material is stably supplied in the surface material.

A condition of such a turbulent airflow mainly depends on the airflow through the air vent holes 14 and a space between the lid 13 of the feeder 11 and an upper surface of the filler material T on the bottom wall 16. If each air vent hole 14 of a feeder has a fixed size, the size of the space between the lid 13 and the upper surface of the filler material T on the bottom wall 16 can be adjusted by moving the bottom wall 16 vertically. Thus, in the feeder of the filler material packing system according to the present invention, the bottom wall 16 of the feeder 11 is movable vertically so that the filler can be desirably mixed with airflow through the air vent holes 14.

Typically, a necessary amount of the filler material is brought in the feeder 11, and the bottom wall 16 is moved upward and downward so as to form a necessary space size above the filler material brought on the bottom wall 16. Then, the air cylinder 21 is driven. When this, as shown in FIG. 3, airflow from the air vent holes to suction port as mentioned above while the filler material is mixed with air. The filler material flows out together with the airflow through the outlet port 15. Then, the filler material mixed with the air passes through the connector 50 and is delivered to the inside of the surface material 70 through the funnel 75 disposed through the entry port 34. The air passes through the surface material 70 while the filler material remains inside the surface material 70. The air is then introduced to the suction port 35 through the suction holes 44.

The space above the filler material in the feeder is changed during delivering the filler material. In order to maintain the space above the filler material in the feeder, the bottom wall 16 is moved upward by driving the air cylinder. When the whole of the filler material on the bottom wall 16 is delivered, the operation of the bottom wall 16 and the vacuum source is stopped. Thus, a predetermined amount of the filler material is packed in the bag-shaped hollow surface material, and thereby an article formed by packing the filler material in the surface material is produced.

In this example, an amount of the filler material to be charged in the feeder is an amount necessary for only one surface material. Alternatively, an amount necessary for a plurality of surface materials may be charged in the feeder. If the amount necessary for a plurality of surface materials is charged therein, the operation of the vacuum source and the air cylinder is stopped when a predetermined amount of the filler material necessary for one surface material has been delivered through the outlet port to the inside of the surface material. Then, the surface material in the suction-type packing container is replaced with another surface material. Thus, an article formed by packing the filler material in the surface material can be continuously formed.

Figure 10:
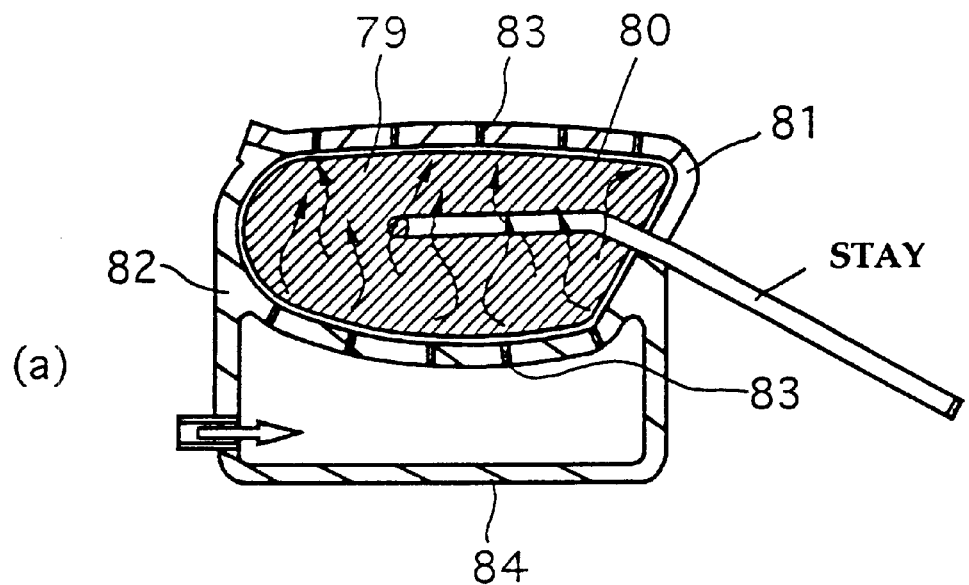
FIG. 10(a) shows that an article packed a filler material in a bag-shaped hollow surface material.
FIG. 10(b) shows a sectional view of a product packed the surface material with the filler material manufactured in accordance with the present invention.
Figure 10:
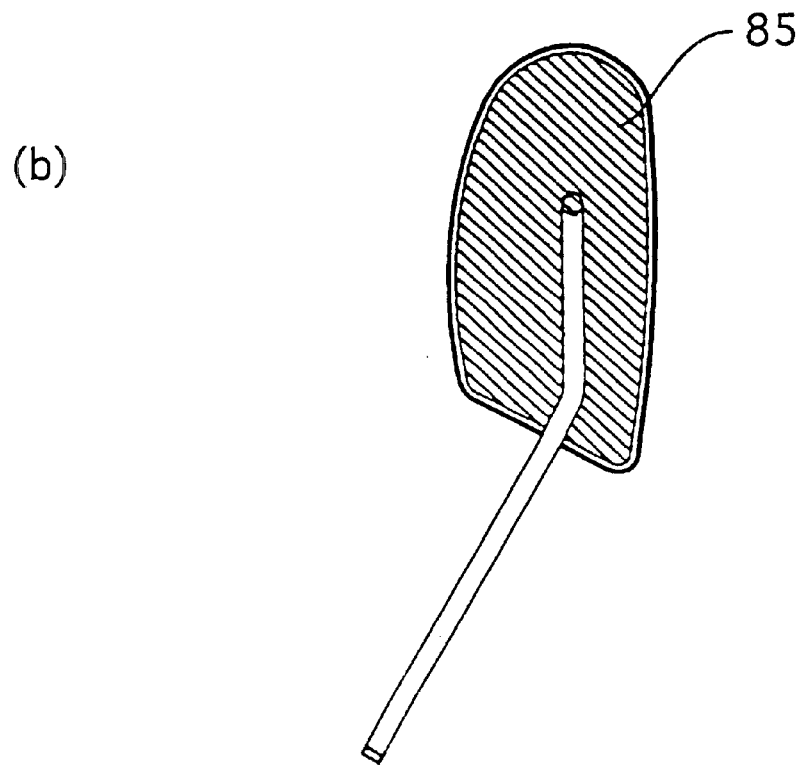

In general, the article 79 slightly expands more than its predetermined shape, even though the surface material is formed in a predetermined shape. This article 79 placed in a molding device 80 as shown in FIG. 10. The molding device 80 has an upper mold 81 and a lower mold 82, and a predetermined space is formed by those upper and lower molds 81, 82. The molding device 80 has holes 83, and steam passes through those holes 83. A steam chamber 84 is provided under the lower mold 82, and steam is entered into the steam chamber 84 and is then entered into the space between the upper and the lower molds 81, 82 through the holes 83 provided in the lower mold 82. As shown in FIG. 10(a), the steam entered into the space of the molding device 80 passes through the article 79 and is then evacuated through the holes 83 of the upper mold 81.

This steam contacts to the binder, and then, the binder cures so that the filler material adheres each other and adheres to a inner surface of the surface material.

The article packed the filler material in the surface material is ejected from the molding device, and then, it is set in a dryer at 120 centigrade degrees for one hour to remove residual water, and thereby, a complete article 85 is produced (FIG. 10(b)).

In accordance with the present invention, it is possible to stably pack a scattered granular or fragmental filler material in a bag-shaped hollow surface material. Thus, in an article produced in accordance with the present invention, the density of the filler material in the bag-shaped hollow surface material is even and its shape is formed in a desirable shape. If the filler material is mixed with a binder, the filler material can adhere each other and adhere to an inner surface of the surface material.

In accordance with the present invention, the filler material is stably packed in the surface material, and thereby, the packing work becomes efficiency and its quality becomes even.

In manufacturing steps of a seat of an automobile, waste such as chips of urethane foam and fragments of surface material is produced. In accordance with the present invention, not only such a waste but also fine powder and feather can be used as the filler material, and the filler material can be packed in the bag-shaped hollow surface material. In particular, in the art such chips of urethane foam and fragments of surface material were wasted. However, in accordance with the present invention, such waste can be recycled.

What is claimed is:

1. A filler material packing system for packing a granular or fragmental filler material in a bag-shaped hollow surface material, including:

a suction pump;

a suction-type packing container having an inner space for positioning the surface material, a suction port connected between said suction pump and said inner space, and an entry port coaxial with an opening of said surface material, said filler material being delivered in said surface material through said entry port and said opening;

a feeder for delivering said filler material, said feeder having a lid covering an open end of the feeder, a sidewall and a bottom wall, air vent holes and an outlet being provided in an upper part of said feeder adjacent the lid, said vent holes providing air into the feeder, said outlet being connected to said entry port through connecting means, said bottom wall being movable vertically to deliver said filler material to said outlet;

said suction-type packing container having a first part and a second part, said first and second parts being pivotally connected to each other; and a molding device provided in said suction-type packing container, said molding device having a first mold and a second mold, and said surface material being positioned in a cavity formed by said first and second molds, said first and second molds have suction holes that connect between the inside of said cavity and the outside of said cavity.

2. The filler material packing system of claim 1, wherein said molding device has an inlet coaxial with said entry port of said suction-type packing container, and said first mold of said molding device is fixed to said first part of said suction-type packing container, and said second mold of said molding device is fixed to said second part of said suction-type packing container, and thereby, when said first part of said suction-type packing container is opened and closed with respect to said second part thereof, said first mold of said molding device is simultaneously opened and closed with respect to said second mold of said molding device.

3. A method for packing said filler material in said surface material using said filler material packing system of claim 2, comprising steps of:

bringing a necessary amount of said filler material in said feeder;

positioning said bottom wall of said feeder so as to form a predetermined space between said lid of said feeder and an upper surface of said filler material brought therein;

driving said suction pump, said outlet of said feeder being connected to said entry port of said suction-type packing container through said connecting means, so that airflow is formed through said filler material packing system, said airflow being formed from said air vent holes of said feeder to said outlet port of said supply port, from said outlet port to said entry port of said suction-type packing container through said connecting means and form said opening of said surface material coaxial with said entry portion to said suction port of said suction-type packing container through the inside of said surface material; and moving said bottom wall of said feeder upward in order to necessarily mix the air and said filler material in the space between said lid of said feeder and said upper surface of said filler material brought therein, when said airflow is formed.

4. The filler material packing system of claim 1 wherein said opening of said surface material is connected to said entry port of said suction-type packing container using a funnel.

5. The filler material packing system of claim 4 wherein a sectional shape of said entry port is circular, and said funnel has a cylindrical plug matched to said entry port and a nozzle that has an elliptical internal channel diverted from an end of said plug in one direction and is tapered in another direction perpendicular to said one direction.

6. The filler material packing system of claim 5 wherein said channel is diverted at an angle to said nozzle of said funnel of at least 45 degrees.

7. The filler material packing system of claim 1 wherein said feeder has an air cylinder connected to said bottom wall of said feeder to move said bottom wall vertically.

8. A method for packing said filler material in said surface material using said filler material packing system of claim 1, comprising steps of:

bringing a necessary amount of said filler material in said feeder;

positioning said bottom wall of said feeder so as to form a predetermined space between said lid of said feeder and an upper surface of said filler material brought therein;

driving said suction pump, said outlet of said feeder being connected to said entry port of said suction-type packing container through said connecting means, so that airflow is formed through said filler material packing system, said airflow being formed from said air vent holes of said feeder to said outlet port of said supply port, from said outlet port to said entry port of said suction-type packing container through said connecting means and form said opening of said surface material coaxial with said entry portion to said suction port of said suction-type packing container through the inside of said surface material; and moving said bottom wall of said feeder upward in order to necessarily mix the air and said filler material in the space between said lid of said feeder and said upper surface of said filler material brought therein, when said airflow is formed.

9. The method of claim 8 wherein said filler material is selected from granules or fragments of urethane foam, fabric, plastics or a mixture thereof.

10. The method of claim 9 wherein a water reactive binder is premixed with said filler material, said binder is a water reactive urethane binder, steam is passed through an article formed by packing said filler material in said surface material, and thereby said filler material is adhered each other and is adhered with an inner surface of said surface material.

\* \* \* \* \*